Feb. 18, 1936. R. HOFSTETTER ET AL 2,030,989
COIL WINDING MACHINE
Filed Dec. 10, 1931 7 Sheets-Sheet 2

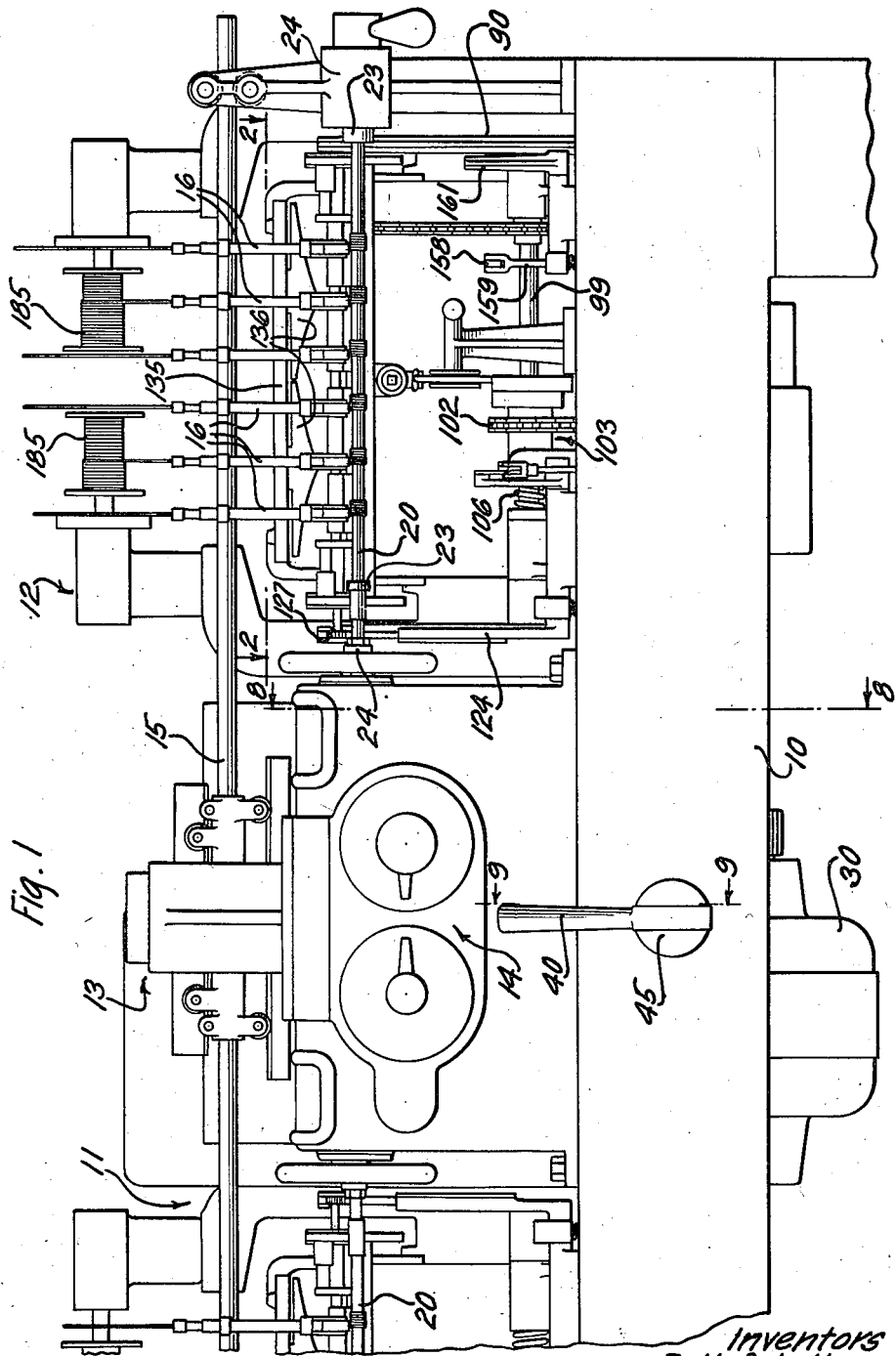

Inventors
R. Hofstetter
J. W. Sager
By H. Q. Whitehorn Att'y.

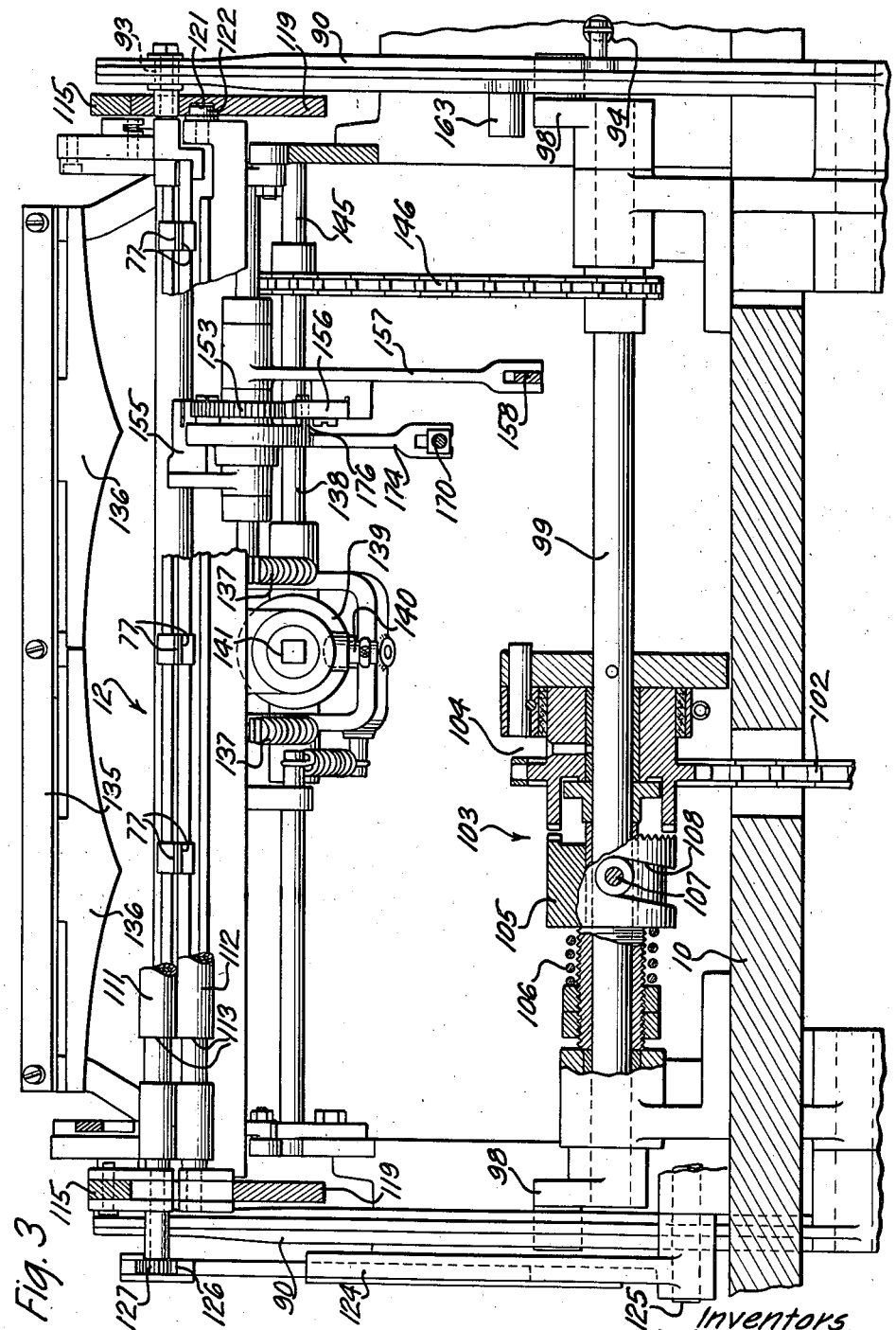

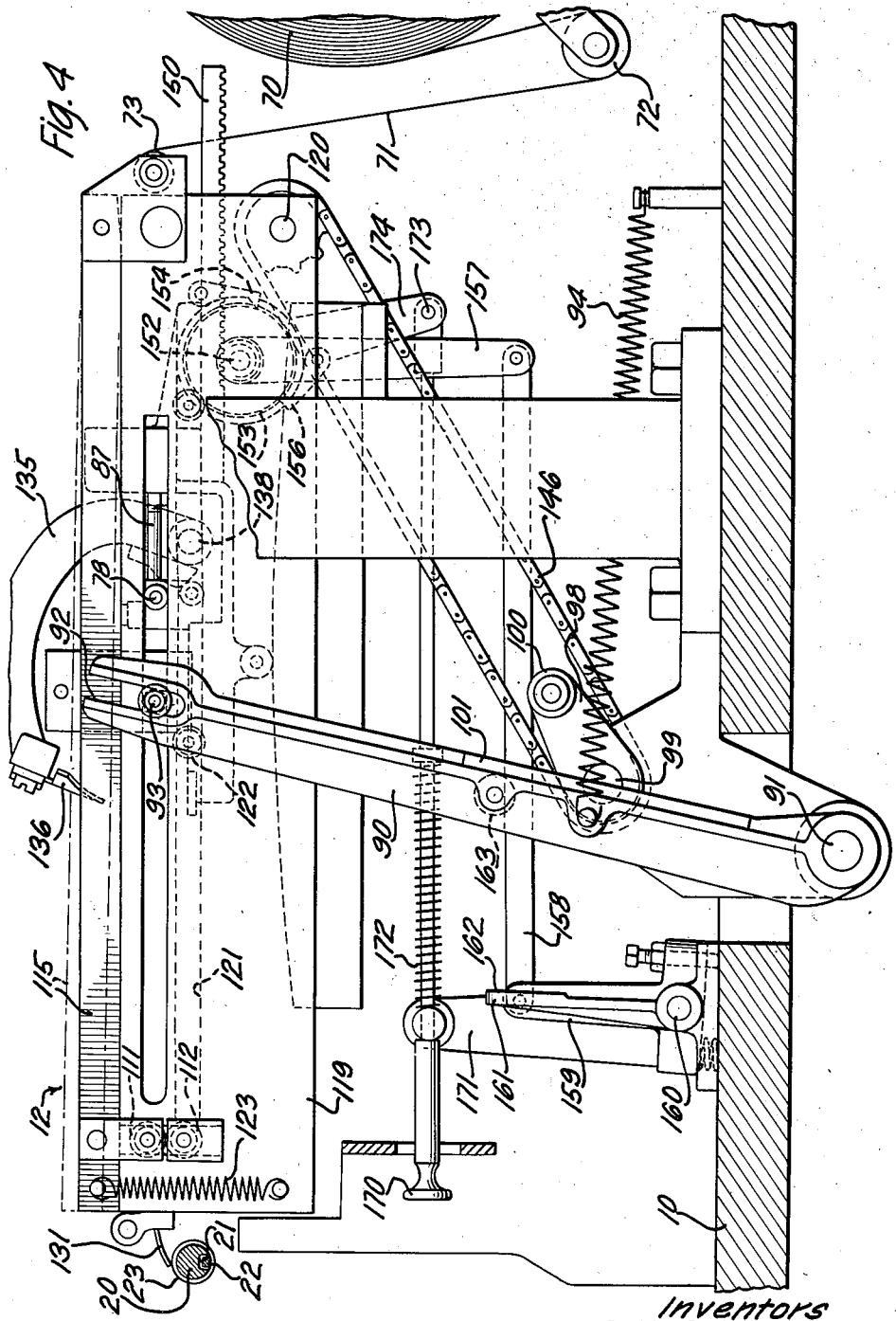

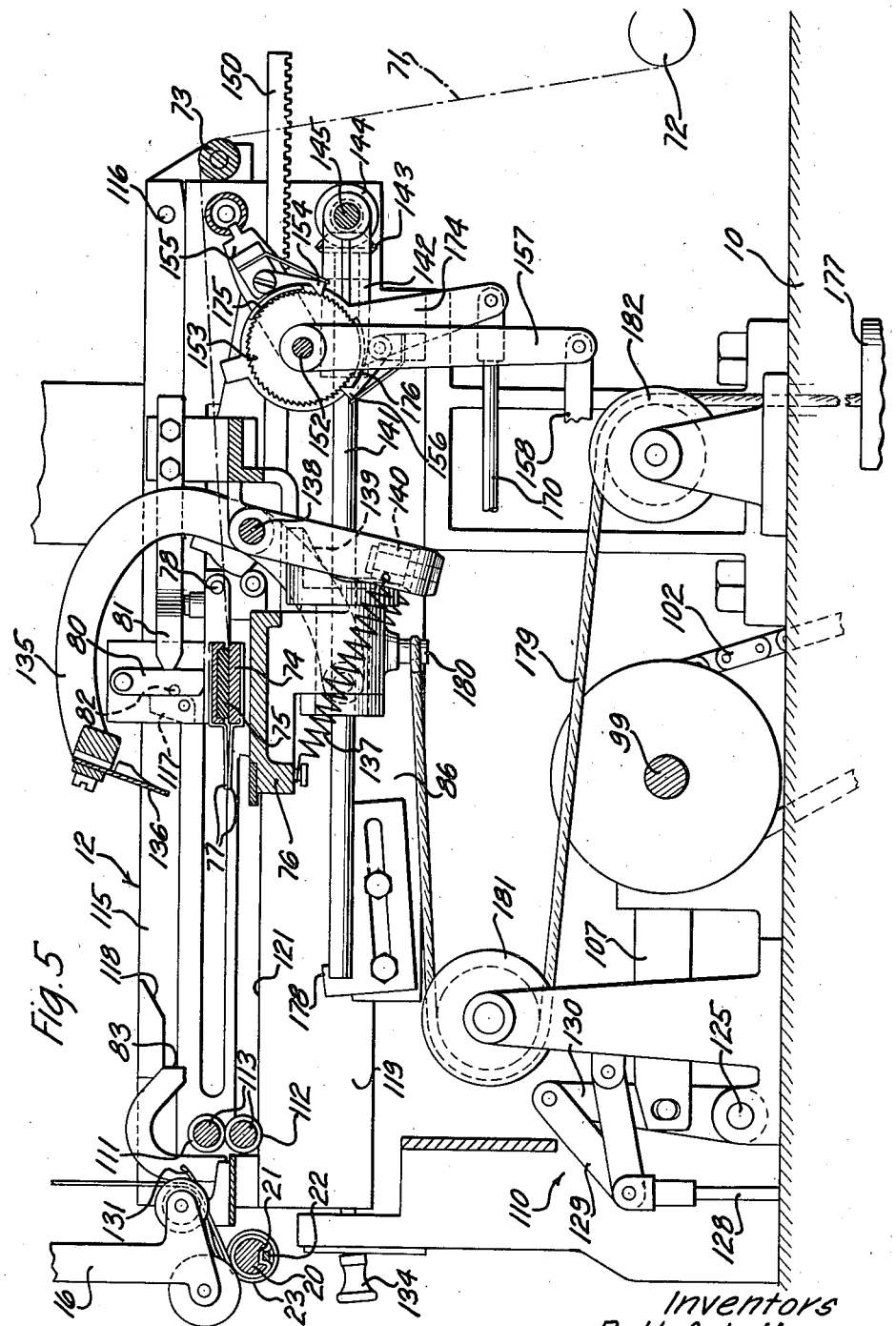

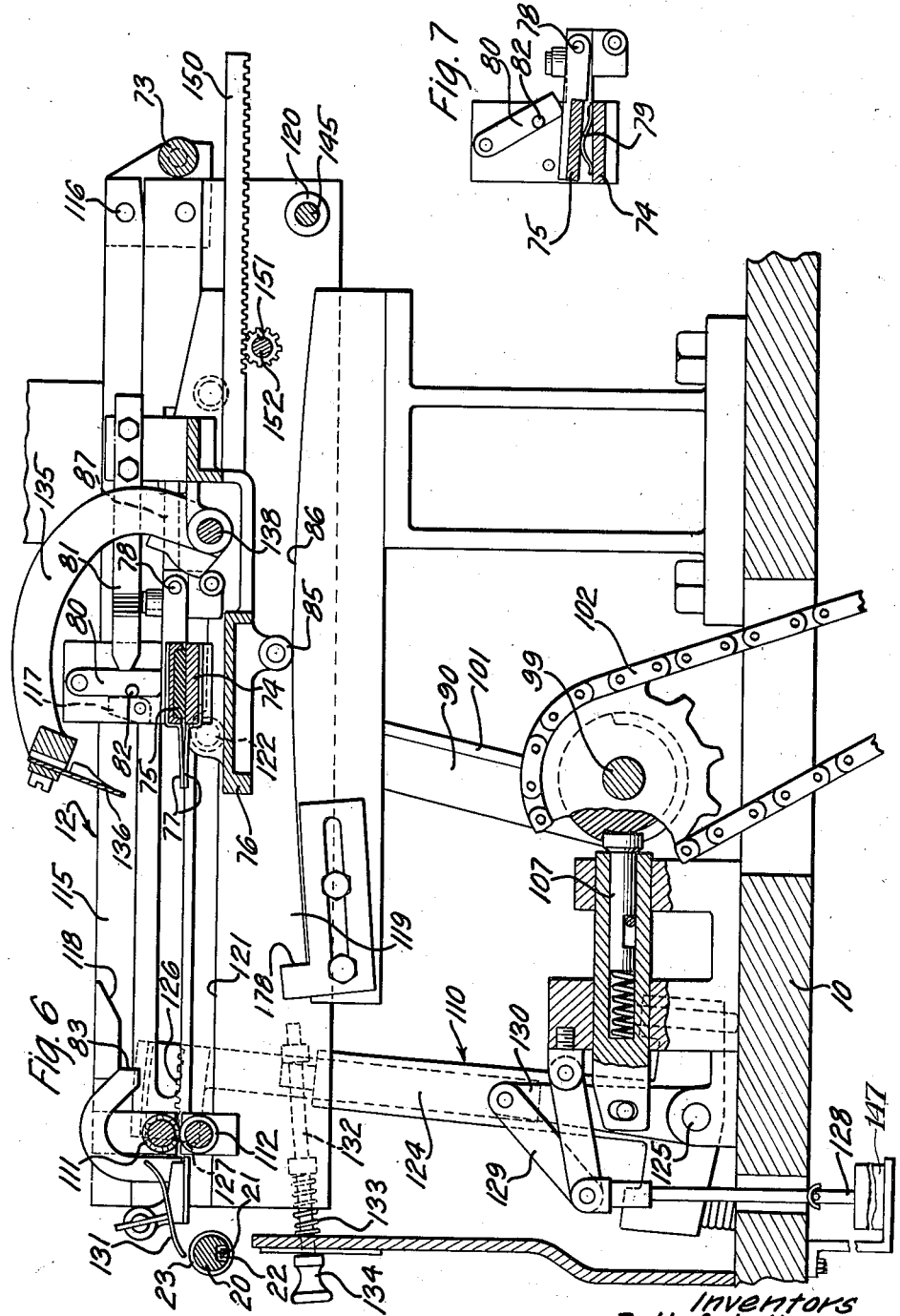

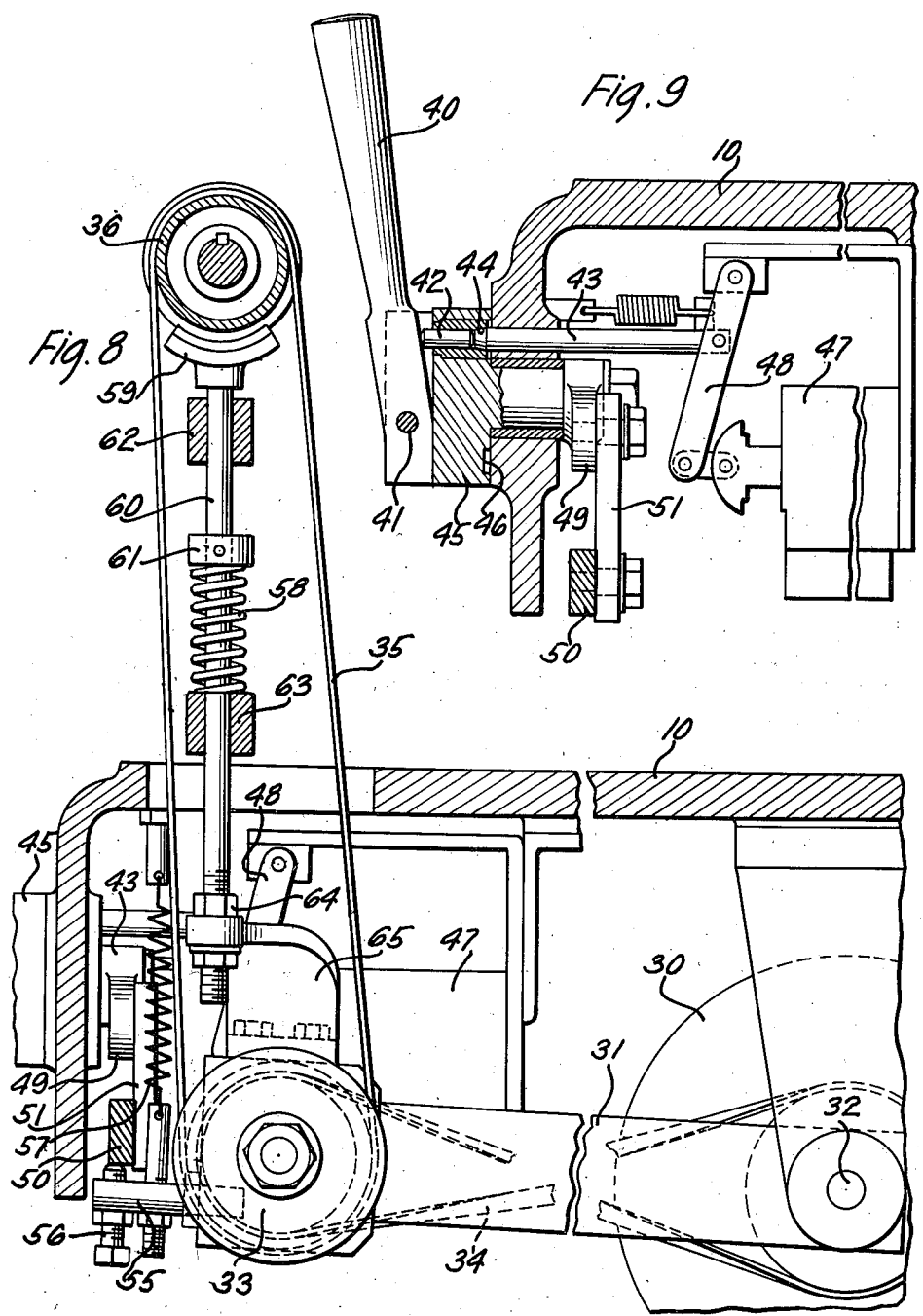

Patented Feb. 18, 1936

2,030,989

UNITED STATES PATENT OFFICE 2,030,989

COIL WINDING MACHINE

Robert Hofstetter, Downers Grove, and John W. Sager, Oak Park, Ill., assignors to Western Electric Company, Incorporated, New York, N. Y., a corporation of New York Application December 10, 1931, Serial No. 580,184

16 Claims. (Cl. 242—10)

This invention relates to a coil winding machine and more particularly to a machine for winding paper filled coils.

The object of this invention is to provide a more practical, efficient, and expeditious machine for winding coils.

In accordance with the object of this invention, there is provided in one embodiment thereof a rotatable winding spindle upon which a plurality of coils are simultaneously wound with the windings of the respective coils disposed in superposed layers. Means is provided for intermittently inserting an interleaving material, such as strips of paper, or other insulating material between the superposed windings of the coils being wound. A reciprocable means is provided for intermittently advancing to the inserting means a strip of interleaving material of a length determined by the extent of movement of the reciprocable means, said extent of movement being successively increased by means responsive to a movement of the reciprocable means in one direction, whereby each strip of interleaving material is of greater length than the preceding strip. The operative positions of the material advancing and inserting means relative to the winding spindle are changed for each successive material advancing and inserting operation in accordance with the increasing diameter of the coil being wound.

Other objects and advantages of this invention will be more fully understood from the following detailed description taken in connection with the accompanying drawings, wherein Fig. 1 is a front elevational view of the machine, one section thereof being partially broken away;

Fig. 2 is an enlarged sectional view taken along the line 2—2 of Fig. 1;

Fig. 3 is a sectional view taken substantially along the line 3—3 of Fig. 2;

Fig. 4 is an enlarged fragmentary sectional view taken substantially along the line 4—4 of Fig. 2;

Fig. 5 is an enlarged sectional view taken substantially along the line 5—5 of Fig. 2;

Fig. 6 is an enlarged sectional view taken substantially along the line 6—6 of Fig. 2;

Fig. 7 is an enlarged sectional view taken across one end of the paper gripping members;

Fig. 8 is an enlarged sectional view taken along the line 8—8 of Fig. 1, with the upper casing removed, and Fig. 9 is an enlarged fragmentary sectional view taken along the line 9—9 of Fig. 1.

Referring now to Fig. 1 of the drawings, it will be noted that a supporting base 10 has two winding units 11 and 12 mounted thereupon and separated from each other by a distributing mechanism 13 and a counting mechanism 14. The distributing and counting mechanisms are disclosed in a copending application of Robert Hofstetter, Serial No. 580,183, filed December 10, 1931. The distributing mechanism 13 will be referred to generally in this application merely for the purpose of illustrating the winding and paper feeding mechanism. This distributing mechanism has a reciprocating bar 15 provided with a plurality of strand guiding or distributing units 16, which are disclosed in a copending application of John A. Whitaker, Serial No. 494,228, filed November 8, 1930, now Patent No. 1,929,940, issued Oct. 10, 1933.

In view of the fact that the winding units 11 and 12 are identical in construction, the winding unit 12 will be described in detail and this description will apply equally as well to the winding unit 11.

The winding unit 12 consists of a winding spindle 20 (Figs. 1, 2, 4, 5 and 6) which has a longitudinally extending groove 21 therein for receiving the ends of strands which are to be wound, these ends being held in the groove by a key 22, the ends of which are held against displacement by split locking rings 23. The ends of the winding spindle 20 are received in clutch members 24 of a suitable type for removably securing the winding spindle in place and connecting it with a power means for imparting a rotary movement thereto.

The mechanism for imparting a rotary movement to the winding spindle 20 is shown in Fig. 8 and consists of a motor 30 mounted upon a bracket 31 hingedly carried by the supporting base 10, the hinge connection of the bracket being in alignment with the axis of the motor. The other end of the bracket 31 has a double pulley 33 rotatably mounted thereupon, one portion of which receives a belt 34 connecting it with the motor 30, and the other portion of which receives a belt 35 connecting it with a pulley 36. The pulley 36 is fixed to the innermost clutch 24 for the purpose of imparting a rotary movement to the winding spindle 20, when the belt 35 is held taut.

Means is provided for holding the belt 35 taut, for causing a driving connection between the motor 30 and the winding spindle 20 and is arranged to make the belt 35 loose upon the pulley 36 and at the same time apply a brake to the pulley 36 to stop the rotation of the winding spindle 20. This means is shown in Figs. 8 and 9 and consists of a hand-lever 40, pivoted at 41, and arranged to move a pin 42 inwardly to remove a retaining bar 43 free of an aperture 44, against the tension of a spring, for allowing movement of the lever 40 with a pivoted head 45, to which it is secured. The pivoted head 45, which has the pin 42 and the aperture 44 disposed therein has an annular recess 46 associated with the aperture 44, in which the end of the retaining bar 43 rides during the rotary movement of the pivoted head 45 for the purpose of frictionally holding pivoted head in any position into which it is moved. The inward movement of the retaining bar 43 is also controlled automatically by a suitable electrical control mechanism 47, through a link 48, when a predetermined number of windings have been made for moving the retaining bar free of the pivoted head 45 for allowing the pivoted head to resume its normal position. The rotation of the pivoted head 45 in a clockwise direction, looking from the left (Fig. 9), will impart movement to a lever 49, and, due to the connection of a bar 50 with the lever 49 by means of a link 51, a downward movement will be imparted to the bar. The connection of the bar 50 with the bracket 31 is shown in Fig. 8 and consists of a projection 55 connected to the bracket 31 and having an adjusting screw 56 disposed in the outer end thereof and arranged to engage the bar 50; therefore, a movement of the hand-lever 40 with the rotatable member 45 in a clockwise direction will cause the bar 50 to move downwardly, thus forcing with it the free end of the bracket 31 and, by doing so, the belt 35 will be drawn taut over its pulleys, affecting a driving connection between the winding spindle and the motor. When the tension upon the belt 35 is released, due to the movement of the hand-lever 40 in a counter clockwise direction, the spiral tension springs 57, aided by the force of a helical compression spring 58, will move the free end of the bracket 31 upwardly, making the belt 35 loose and applying a brake 59 to the pulley 36 to stop the rotation thereof. The brake 59 is carried by a brake rod 60, which extends through the spring 58, carrying thereupon an abutting ring 61, and extending through bearings 62 and 63, the latter of which the spring 58 rests upon. The lower end of the brake rod 60 is adjustably secured at 64 to a bracket 65, which is fixed to the free end of the bracket 31.

The paper feeding, cutting, and measuring mechanism is shown in Figs. 1 to 7, inclusive, attention being called to Figs. 4 and 5, wherein there is shown a supply roll of paper 70 mounted upon a suitable spindle and arranged to release a supply of paper as it is drawn therefrom. The paper, which will be designated by the reference numeral 71, passes beneath a weighted roller 72 up and over a roller 73, and between paper gripping members 74 and 75. The paper gripping members 74 and 75 are movably mounted upon a carriage 76, and are each provided with feeding members 77 which are disposed in pairs at spaced positions throughout the length of the gripping members 74 and 75. The arrangement of the feeding members 77 is shown in Fig. 3. The paper gripping member 74 is movable horizontally upon the carriage 76 but is not movable vertically, while the paper gripping member 75 is pivoted at 78 and is normally urged upwardly, away from the paper gripping member 74 by springs 79 (Fig. 7) which are disposed at the outer ends thereof, for the purpose of allowing movement of the paper gripping members free of the paper during certain periods of operation of the machine.

The paper gripping members, as shown in Figs. 5 and 6, are in their gripping positions, which positions are brought about by movement of latches 80 into vertical positions, which movement is affected by the engagement of the latches 80 with stop members 81 mounted upon the carriage 76. The latches 80 are pivotally mounted upon vertically extending projections of the gripping member 74 and have pins 82 extending transversely with respect thereto for engaging abutting members 83, the purpose of which will be hereinafter described. The ends of the carriage 76 are provided with rollers 85, which rest upon arcuate shaped tracks 86 for the purpose of conveying the carriage 76 toward and away from the winding spindle 20, carrying with it the stop members 81, for causing a gripping of the paper between the gripping members 74 and 75, and abutting rods 87 for stopping the rearward movement of the gripping members.

The mechanism for imparting movement to the gripping members 74 and 75 is shown in Figs. 3 to 6, inclusive, and consists of oscillating arms 90, the lower ends of which are fixed to a common shaft 91, rotatably disposed in suitable bearings, while the upper ends are forked, as at 92, for receiving rollers 93 mounted upon the gripping member 74. The arms 90 are normally urged rearwardly by springs 94 and a mechanism is provided for moving the arms forwardly. This mechanism consists of actuating levers 98 mounted upon the ends of a shaft 99 and having rollers 100 positioned at the outer ends thereof and arranged to engage and move upon abutting plates 101 carried by the arms 90. The shaft 99 is driven by a suitable motor and speed reducing mechanism (not shown), connection with which is made through a sprocket and chain arrangement 102 and a clutch mechanism indicated generally at 103 (Fig. 3). The clutch 103 consists of a freely rotatable portion 104 mounted upon the shaft 99 and a slidably keyed portion 105 urged toward and into engagement with the portion 104 by a compression spring 106. A clutch releasing plunger 107 has its outer end disposed adjacent the clutch portion 105 in which there is disposed a spiral groove 108 for receiving the end of the plunger and for moving the clutch portion 105 away from and free of the clutch portion 104 to disconnect the shaft 99 from its driving means and to stop the rotation of the shaft. The plunger 107 is shown more clearly in Fig. 6 and is operatively connected to a paper feeding mechanism indicated generally at 110.

The paper feeding mechanism includes a pair of gripping and advancing rolls 111 and 112, having recessed portions 113 disposed at spaced positions throughout the lengths thereof for receiving the resilient members 77 carried by the paper gripping members 74 and 75. The roll 111 is carried by one end of an upper frame 115, which is pivotally supported at 116 to permit the roll 111 to be moved away from the roll 112 during the insertion of a portion of paper between the rolls. The movement of the frame 115 is brought about by cam blocks 117, disposed upon the vertically extending projections of the gripping member 74, engaging cams 118 disposed adjacent the forward end of the upper frame 115. Only one portion of the upper frame 115 is shown in Fig. 6, but it is to be understood that a similar portion is positioned upon the opposite side of the mechanism for supporting the opposite end of the roll 111.

The roll 112 has its ends journaled in the forward end of a lower frame 119, which is pivotally supported at 120 and has longitudinally extending slots 121 disposed in the inner side walls thereof for receiving supporting rollers 122 (Fig. 3). During the rearward movement of the carriage 76, the lower frame 119 is gradually moved upwardly about its pivot and as the upper frame 115 normally rests upon the lower frame, it is also moved upwardly, the upper frame being urged downwardly by springs 123 (Fig. 4).

An actuating lever 124 is pivotally mounted at 125 and has an upper portion movably disposed in a hollow lower portion to compensate for the movement of the roll 111 and to retain its operative engagement therewith. The operative engagement of the actuating lever 124 with the roll 111 consists of a toothed or rack portion 126 integral with the upper end of the actuating lever 124 inter-engaging pinion 127 fixed to the end of the roll 111 (Fig. 3). The actuating lever 124 has a pull rod 128 operatively connected thereto through a link 129 and a lever 130, and the pull rod 128 is actuated at predetermined intervals during the operation of the machine for rapidly actuating the rolls 111 and 112 to move a portion of paper beneath the strands at the time the strands are positioned to begin their movement in the opposite direction from which they had just traveled. The pull rod 128 is actuated by the aid of a solenoid 147 operatively connected to the lower end thereof (Fig. 6) and energized by electrical energy in a circuit which is controlled by electrical switches positioned so that they may be actuated alternately by the distributing unit during its movement first in one direction and then in another. One way of mounting and actuating the switches is shown in application, Serial No. 580,183, above referred to.

A guide 131 is adjustably arranged to guide the portion of the paper advanced by the rolls 111 and 112 beneath the strands when they are ready to begin a new series of windings. A hand actuated means is shown in Fig. 6 for actuating the rolls 111 and 112 and consists of a pull rod 132 connected to the actuating lever 124 and normally urged inwardly by a spring 133, but capable of being moved outwardly for moving the lever 124 to the left by the operator pulling upon the knob or handle 134.

The mechanism for cutting the paper into portions of predetermined lengths consists of a pivotal knife 135 (Figs. 1 to 6, inclusive) having cutting blades 136 removably secured to the forward end thereof and extending downwardly so that their cutting edges may be moved through the paper, held at its forward edge by the rolls 111 and 112 and at a position adjacent the line of cutting by the paper gripping members 74 and 75. The blades 136 curve downwardly through an arcuate path from their outer edges to a point adjacent the center thereof for the purpose of causing a shearing of the paper as the blades are moved therethrough. The cutting member 135 is normally urged into the position shown in Fig. 5 by tension springs 137 and is forced about its pivot 138 to move the shearing blades 136 downwardly by the rotation of a cam 139 and its engagement with a cam roller 140 carried by the cutting member 135. The cam 139 is shown in Fig. 5 and is keyed upon a cam shaft 141, which is journaled in a bearing 142 and extends through the carriage 76, permitting movement of the carriage relative to the shaft. The cam shaft 141 is rotated intermittently due to its connection with the shaft 99 (Fig. 3) through a beveled-gear 143 mounted upon the shaft 141 and inter-engaging a beveled-gear 144 mounted upon a shaft 145, which shaft is operatively connected to the shaft 99 through a sprocket and chain connection 146 (Fig. 3). The cam 139 is arranged so that it will actuate the cutting member 135 after the paper has been advanced by the forward movement of the carriage 76, the end of the paper gripped by the rolls 111 and 112 and the carriage 76 returned to its rearward or idle position.

The measuring means, that is, the means whereby a portion of paper of greater length will be cut at each successive operation after the first portion has been cut, consists of racks 150 fixed to the carriage 76, at the sides thereof, and extending rearwardly therefrom (Figs. 5 and 6), the teeth of the racks 150 interengaging teeth of pinions 151 fixedly mounted upon a shaft 152, which is journaled in suitable bearings (not shown), and has mounted thereupon a ratchet wheel 153. A retaining pawl 154 is carried by a stationary member 155 and engages the teeth of the ratchet wheel 153 for holding the ratchet wheel against rotation in a counter-clockwise direction (Fig. 5). An actuating pawl 156 also engages the teeth of the ratchet wheel 153 and is carried by a lever 157 having one end loosely mounted upon the shaft 152 and the other end operatively connected through a link 158 to a lever 159 (Fig. 4), which lever is pivoted at 160 and arranged to be moved by movement of an abutting lever 161. The abutting lever 161 has a flattened surface 162 positioned to be engaged by a roller 163 carried by one of the arms 90 so as to move the abutting lever 161 a predetermined distance during each actuation of the arm 90. Any suitable spring means (not shown) may be associated with the pawl moving mechanism for returning the mechanism to its normal position when freed by the arm 90 associated therewith.

When the carriage 76 has reached its rearmost position and the winding of the coil has been completed, the carriage may be returned to its foremost position by the operator pulling upon a pull rod 170 (Fig. 4). The pull rod 170 extends through an aperture in a stationary bracket 171 and has disposed thereupon a compression spring 172 for the purpose of urging the pull rod to the right (Fig. 4). The inner end of the pull rod 170 is pivotally secured at 173 to a pawl releasing member 174, which is rotatably mounted upon the shaft 152 adjacent the sprocket wheel 153 and has arcuate shaped pawl engaging members 175 and 176 carried thereby, extending over the peripheral edge of the sprocket wheel, and arranged to engage tapered surfaces of the pawls 154 and 156 when the pawl releasing member is actuated for the purpose of freeing the pawls from the ratchet wheel. When the pawls 154 and 156 are moved free of the ratchet wheel 153, a weight 177, due to its connection with the carriage 76, will move the carriage forwardly until it engages an adjustable stop member 178. The connection of the weight 177 with the carriage 76 includes a cable 179 having one end secured to the weight 177, the other end secured to the carriage 76 at 180 and extending around a pulley 181 and over a pulley 182.

In preparing the machine for operation, the strands, which are supplied from reels indicated at 185 (Fig. 1), are threaded around the distributing units 16 and fixed to the winding spindle 20 by inserting the key 22 in place to force the ends of the strands in the recess 21, after which the key 22 is locked in place by the split locking rings 23. The operator next inserts a portion of paper beneath the strands, which portion is of sufficient width to completely surround the spindle. The machine is now ready to be set in motion by the actuation of the hand-lever 40, after which a plurality of series of windings will be wound to form a plurality of coils, each series of windings being separated by portions of paper fed thereto by the paper feeding mechanism, and the portions of paper increasing in length for each successive series of windings.

In starting the machine the motor switch is closed and the lever 40 is then moved inwardly to move the rod 43 free of the aperture 44, after which the lever 40 is moved in an arcuate path to rotate the pivot head 45 in a clockwise direction (Fig. 1) so as to actuate the lever 49, move the bar 50 downwardly (Figs. 8 and 9), thus moving the forward end of the bracket 31 downwardly to tighten the belt 35 upon its pulleys and operatively connect the spindle 20 with the motor 30, causing the spindle to be rotated at a predetermined rate of speed. The distributing unit 15 is associated with the motor in such a manner that the distributors 16 will be moved laterally at a sufficient rate to distribute the wire around the spindle to form compact windings thereupon.

During the time in which the first series of winding is disposed upon the portion of paper placed around the spindle 20, the paper gripping members 74 and 75 have gripped the end of the paper 71, moved it forwardly, due to the actuation of the arms 90 through the rotation of the lever 98 (Fig. 4), to bring the edge of the paper between the feed rolls 111 and 112. As the gripping members 74 and 75 approach the rolls 111 and 112, the cam blocks 117 engage the cams 118, thus lifting the upper frame 115 with the roll 111, allowing the forward edge of the paper 71 to pass between the rolls 111 and 112, at which time the stop members 83 will engage the pins 82 to release the locking members 80 and allow the springs 79 (Fig. 7) to move the gripping member 75 free of the gripping member 74 to free the paper and allow the gripping members to be moved rearwardly by the springs 94 (Fig. 4) pulling upon the arms 90. As soon as the gripping members 74 and 75 begin their rearward movement, the cam blocks 117 are moved free of the cams 118 and the upper frame 115 is drawn downwardly by the springs 123, thus moving the roll 111 in close engagement with the forward end of the paper causing a gripping relation between the rolls 111 and 112 and the paper 71. When the gripping members 74 and 75 reach their rearmost positions, the stop members 81 engage the locking members 80, moving them again into their vertical locking positions so as to move the gripping member 75 against the tension of the springs 79 to grip the paper and hold it while the knife 135 is being actuated to cut a portion therefrom.

At this point of the operation of the machine, the high portion of the cam 139 (Fig. 5) begins to travel past the roller 140 and moves the knife 135 about its pivot 138, thus moving the blades 136 downwardly through the paper 71, shearing a portion therefrom. When the high portion of the cam 139 has traveled past the roller 140, the springs 137 move the cutting knife 135 to its upper position, shown in Fig. 5.

The portion of paper which has been cut from the strip of paper is held by the feeding rolls 111 and 112 until the series of windings upon the first piece of paper has been completed, at which time the paper feeding mechanism indicated at 110 (Fig. 6), will be actuated for rapidly feeding the portion of paper beneath the strands so that they may begin the next series of windings. The mechanism 110 is actuated by the solenoid 147 which is electrically connected to a reversing mechanism for reversing the movement of the distributing units 16. In actuating the paper feeding mechanism 110, the pull rod 128 is moved downwardly, actuating the lever 130 which moves the actuating lever 124, causing a rapid rotation of the rolls 111 and 112, through the engagement of the rack 126 with the pinion 127, and causing the paper which is held by the rolls to be fed beneath the strands as it is guided by the member 131. This operation is continued for moving the forward edge of the paper 71 between the rolls 111 and 112 where it is held while the gripping members 74 and 75 are returned to their rearmost positions, locked in place while the cutting knife is actuated to cut portions of the paper therefrom, after which the portion of paper is fed beneath the strands as the second series of windings is completed to insulate the second series of windings from the third series of windings, as the first portion of the paper insulates the first series of windings from the second series of windings. The movement of the paper gripping members 74 and 75 rearwardly is limited by the position of the stop members 87, and, as the carriage 76 is moved rearwardly a predetermined distance during the forward movement of the arms 90, where they engage with the lever 161 and cause an actuation of the ratchet wheel 153 to bring about the movement of the carriage 76, the paper gripping members are moved rearwardly a greater distance after each forward movement thereof, thus increasing the length of the portion of paper cut from the supply and fed beneath the strands. As the carriage 76 is moved rearwardly, it is also moved upwardly, in view of the fact that it rides upon the arcuate surfaces of the tracks 86, moving upwardly with it the frames 115 and 119 to compensate for the increase in diameter of the coils as the windings are placed thereupon and to properly position the edge of the portion of paper fed beneath the strands after each series of windings thereupon.

The gripping members 74 and 75 are timed in their forward movement with the actuating mechanism 110 which actuates the rolls 111 and 112 in that the plunger 107 is withdrawn from the member 105 of the clutch 103 during the movement of the actuating lever 124 to rotate the rolls 111 and 112. When the plunger 107 is removed from the clutch member 105, this member is forced by the spring 106 into engagement with the clutch member 104 causing an operative engagement of the shaft 99 with the driving motor, through the clutch 103, which brings into action the arms 90 for moving the paper gripping members 74 and 75 forwardly and during which movement of the arms 90 the sprocket wheel 153 is moved to impart a slight rearward movement to the carriage 76. After the plunger 107 has been removed from the clutch member 105, it is allowed to ride upon the peripheral surface thereof until the spiral groove 108 has been moved into registration therewith, at which time the plunger will be forced into the groove due to the spring shown in Fig. 6, which normally urges it toward the member 105, and during further rotation of the clutch member 105 the spiral formation of the groove 108 will cause the clutch member to move against the tension of the spring 106, thus disconnecting the clutch member 105 from the clutch member 104 and disconnecting the shaft 99 from the power means.

Any desired number of series of windings may be disposed upon the spindle 20 for each coil, each series being insulated from the other by a portion of paper, the successive portions of paper increasing in length to compensate for the increase in diameter of the coils and after the desired number of series of windings have been disposed around the spindle, the electrically controlled mechanism 47 is actuated for moving the retaining bar 43 free of the pivot head 45 for automatically stopping a machine, after which a strip of gummed paper is inserted by the operator beneath the strands, wrapped around the coils and the edges thereof heated by any suitable means for the purpose of causing a joining of the edges thereof by the melted gum. The strands are then cut and the spindle 120 with the coils are removed from the machine, after which the key 22 is drawn from the spindle and the spindle removed from the coil. The coils may then be cut to separate them from each other.

Although the invention has been disclosed and described with respect to one specific embodiment, it is clearly evident that it is possible of other embodiments without departing from the spirit and scope of the present invention which is to be limited only by the scope of the appended claims.

What is claimed is:

1. In a coil winding machine, a winding spindle, feeding rolls for feeding material to said winding spindle, reciprocating members for feeding material to said feeding rolls, a carriage for supporting said reciprocating members, a rack fixed to said carriage, means for actuating said reciprocating members, and means associated with said rack and actuated by said last named means for moving said rack for imparting a horizontal movement to said carriage.

2. In a coil winding machine, a winding spindle, feeding rolls for feeding material to said winding spindle, reciprocating members for feeding material to said feeding rolls, a carriage for supporting said reciprocating members, a rack fixed to said carriage, means for actuating said reciprocating members, means associated with said rack and actuated by said last named means for moving said rack for imparting a horizontal movement to said carriage, and a stop member mounted upon said carriage for limiting the movement of said reciprocating members away from said feeding rolls, the horizontal movement of said carriage moving said stop member away from said feeding rolls and increasing the distance between said reciprocating members and said feeding rolls during each return movement of said reciprocating members.

3. In a coil winding machine, a winding spindle, feeding rolls for feeding material to said winding spindle, reciprocating members for feeding material to said feeding rolls, a carriage for supporting said reciprocating member, a rack fixed to said carriage, means for imparting reciprocatory movement to said reciprocating members, means associated with said rack and actuated by said last named means for moving said rack for imparting a horizontal movement to said carriage, and means for returning said carriage to its normal position adjacent said feeding rolls.

4. In a coil winding machine, a winding spindle, means for gripping material to be fed to said winding spindle, an oscillating arm operatively connected to said gripping means, means for imparting an oscillatory movement to said arm for moving said gripping means toward said spindle, means for moving said oscillating arm for moving said gripping means away from said spindle, the movement of said gripping means away from said spindle determining the length of the material advanced to said spindle, and means actuated by the movement of said arm for varying the extent of movement of said gripping means away from said spindle.

5. In a coil winding machine, a coil winding spindle, a pair of feeding rolls, means for supplying interleaving material to said feeding rolls, including a carriage, gripping members movably disposed upon said carriage and movable toward and away from each other for gripping the interleaving material, means for moving said gripping members toward said feeding rolls for positioning material between said rolls, means for freeing said gripping members from said material, means for moving said gripping members to their normal positions away from said feeding rolls, means for actuating said gripping members upon reaching their normal positions for gripping the material, means for cutting the material adjacent said gripping members, and means for rotating one of said feeding rolls for feeding the cut portion of the material to a coil being wound.

6. In a coil winding machine, a coil winding spindle, means for feeding an interleaving material to a coil being wound comprising a pair of feeding rolls disposed in close proximity to said winding spindle, reciprocal gripping members for advancing the interleaving material to said feeding rolls, a carriage for slidably supporting said gripping members, means for intermittently moving the carriage in one direction during the movement of the gripping members in another direction, and means carried by said carriage for limiting the movement of said gripping members relative to said feeding rolls.

7. In a coil winding machine, a coil winding spindle, means for feeding an interleaving material to a coil being wound comprising a pair of feeding rolls disposed in close proximity to said winding spindle, reciprocal gripping members for advancing the interleaving material to said feeding rolls, a carriage for slidably supporting said gripping members, means for intermittently moving the carriage in one direction during the movement of the gripping members in another direction, means carried by said carriage for limiting the movement of said gripping members relative to said feeding rolls, means for rotatably supporting said feeding rolls, and means carried by said carriage for moving said supporting means during each intermittent movement of said carriage for varying the positions of said feeding rolls relative to said winding spindle.

8. In a coil winding machine, a coil winding spindle, means for feeding an interleaving material to a coil being wound comprising a pair of feeding rolls disposed in close proximity to said winding spindle, gripping members disposed on opposite sides of the interleaving material, means for holding said gripping members in intimate engagement with the material, means for moving said gripping members with the material toward said feeding rolls to feed the material therebetween, and means for releasing said holding means when the forward end of the material is positioned between said feeding rolls for freeing said gripping members from said material.

9. In a coil winding machine, a coil winding spindle, means for feeding an interleaving material to a coil being wound comprising a pair of feeding rolls disposed in close proximity to said winding spindle, gripping members disposed on opposite sides of the interleaving material, means for holding said gripping members in intimate engagement with the material, means for moving said gripping members with the material toward said feeding rolls to feed the material therebetween, means for releasing said holding means when the forward end of the material is positioned between said feeding rolls for freeing said gripping members from said material, means for moving said gripping members away from said feeding rolls, and means for rendering said holding means effective when said gripping members have completed their movement away from said feeding rolls.

10. In a coil winding machine, a coil winding spindle, means for feeding an interleaving material to a coil being wound comprising a pair of feeding rolls disposed in close proximity to said winding spindle, gripping members disposed on opposite sides of the interleaving material, means for holding said gripping members in intimate engagement with the material, means for moving said gripping members with the material toward said feeding rolls to feed the material therebetween, means for releasing said holding means when the forward end of the material is positioned between said feeding rolls for freeing said gripping members from said material, means for moving said gripping members away from said feeding rolls, means for rendering said holding means effective when said gripping members have completed their movement away from said feeding rolls, cutting means, and means for actuating said cutting means for cutting the interleaving material adjacent to said gripping members.

11. In a coil winding machine, a coil winding spindle, means for feeding an interleaving material to a coil being wound comprising a pair of feeding rolls having cooperating annular grooves in the peripheries thereof and disposed adjacent said winding spindle, gripping members disposed upon opposite sides of the interleaving material, and arranged to grip the material, feeding members extending transversely from said gripping members arranged to engage opposite sides of the interleaving material and receivable in the annular grooves of said feeding rolls for feeding the interleaving material therebetween when said gripping members are actuated, and means for actuating said gripping members to move the interleaving material toward and between said feeding rolls.

12. In a coil winding machine, a coil winding spindle, means for feeding an interleaving material to a coil being wound, comprising a pair of feeding rolls disposed in close proximity to said winding spindle, supporting members for rotatably supporting said feeding rolls, reciprocable gripping members, a carriage, means disposed upon said carriage for moving said supporting members simultaneously during movement of said carriage, means for moving said gripping members toward said feeding rolls to advance the interleaving material thereto, means carried by said gripping members for moving one of said supporting members for moving the feeding roll carried thereby away from the other feeding roll so that the interleaving material may be fed therebetween, and means for moving said carriage a predetermined distance away from said feeding rolls during the movement of the gripping members toward said feeding rolls.

13. In a coil winding machine, a winding spindle upon which a plurality of series of strand windings may be served, a pair of feeding rolls disposed adjacent said winding spindle, a carriage mounted for movement relative to said feeding rolls, movable elements for supporting said feeding rolls, means operatively connecting said supporting elements to said carriage for simultaneously moving said supporting elements and said feeding rolls relative to said spindle during movement of said carriage, and means for successively feeding sheets of material to said feeding rolls.

14. In a coil winding machine, a winding spindle upon which a plurality of series of strand windings may be served, a pair of feeding rolls disposed adjacent said winding spindle, a carriage mounted for movement relative to said feeding rolls, movable elements for supporting said feeding rolls, means operatively connecting said supporting elements to said carriage for simultaneously moving said supporting elements and said feeding rolls relative to said spindle during movement of said carriage, gripping members for gripping sheet material, means for actuating said gripping members for moving the sheet material between said feeding rolls, and means carried by said gripping members for moving said feeding rolls relative to each other to receive the material from said gripping members.

15. In a winding machine, a winding spindle, reciprocable means for advancing windable material toward said spindle comprising a pair of jaw members for gripping the material therebetween, spring means normally holding said jaw members open, a movable element for closing said jaw members, an abutment for actuating said element to close said jaw members at the end of travel of said reciprocable means in one direction, and a second abutment for actuating said element to render said spring means effective for opening said jaw members at the end of travel of said means in the opposite direction.

16. In a winding machine, a winding spindle, a frame pivoted at its rear end and having its forward end adjacent said spindle, material feeding means mounted on said frame adjacent said spindle, a carriage supporting the forward end of the frame, means for moving the carriage, and means responsive to a movement of the carriage for imparting a pivotal movement to said frame.

ROBERT HOFSTETTER.
JOHN W. SAGER.

DISCLAIMER 2,030,989.—*Robert Hofstetter*, Downers Grove, and *John W. Sager*, Oak Park, Ill. COIL WINDING MACHINE. Patent dated February 18, 1936. Disclaimer filed February 20, 1937, by the assignee, *Western Electric Company, Inc.*

Hereby enters this disclaimer to claim 16 in said Letters Patent.

[*Official Gazette March 30, 1937.*]